Figure 4:
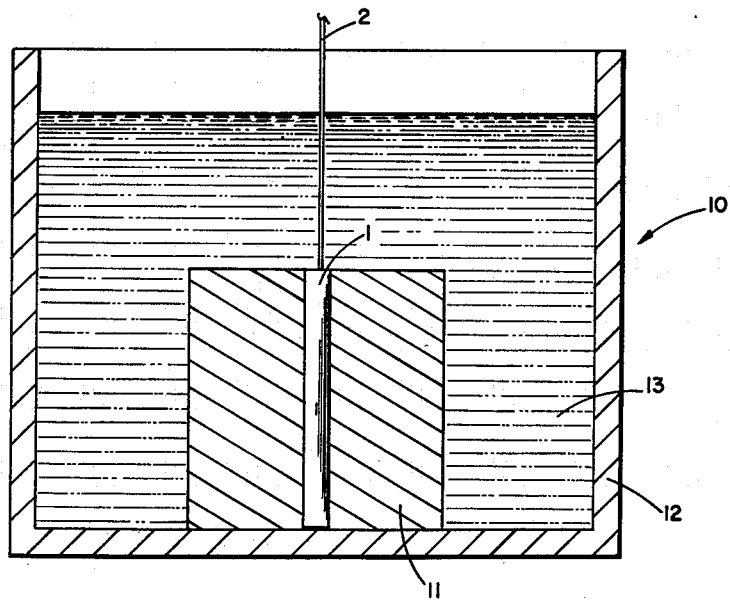

May 3, 1960 N. E. HUSTON 2,935,456
VARIABLE AREA CONTROL ROD FOR NUCLEAR REACTOR
Filed March 14, 1957 2 Sheets-Sheet 1
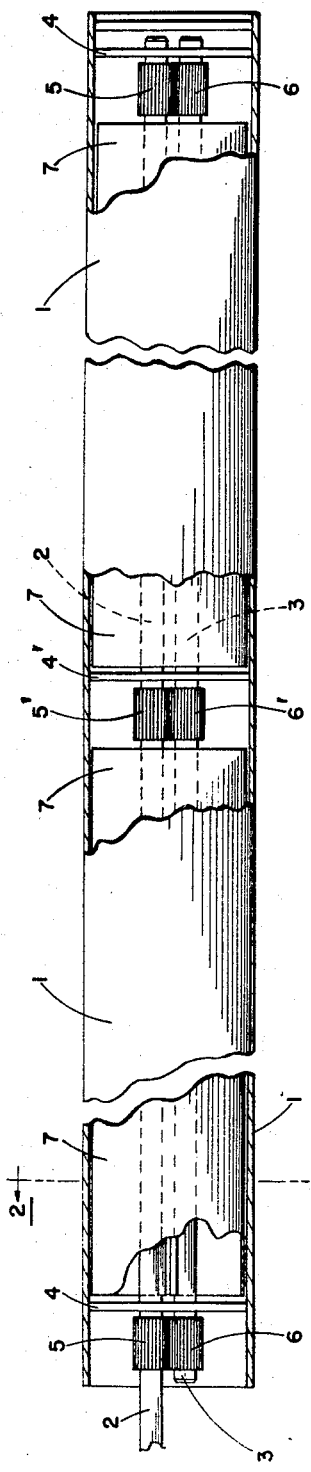
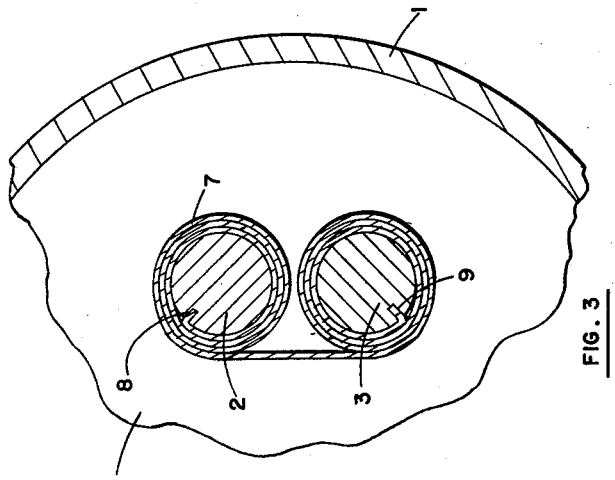
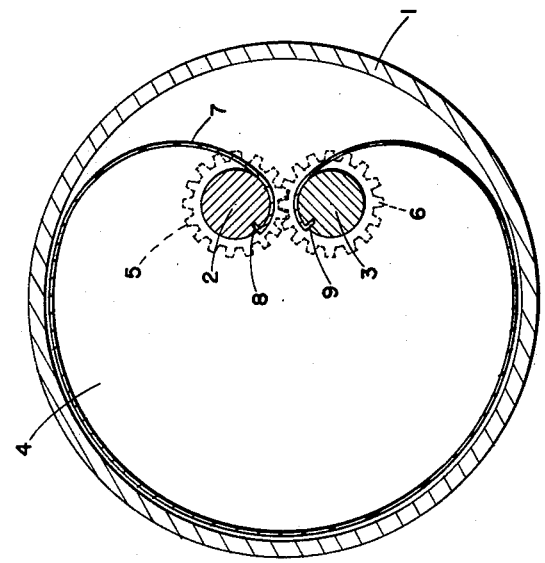
INVENTOR.
NORMAN E. HUSTON
BY
*Gerald A. Koris*
ATTORNEY May 3, 1960 N. E. HUSTON 2,935,456
VARIABLE AREA CONTROL ROD FOR NUCLEAR REACTOR
Filed March 14, 1957 2 Sheets-Sheet 2

INVENTOR.
NORMAN E. HUSTON
BY
ATTORNEY

United States Patent Office
2,935,456
Patented May 3, 1960

2,935,456

VARIABLE AREA CONTROL ROD FOR NUCLEAR REACTOR

Norman E. Huston, Woodland Hills, Calif., assignor, by mesne assignments, to the United States of America as represented by the United States Atomic Energy Commission Application March 14, 1957, Serial No. 646,019

5 Claims. (Cl. 204—193.2)

My invention relates to an improved nuclear reactor control rod, and more particularly to a control rod of variable area.

For information concerning the theory, construction and operation of nuclear reactors, reference is made to U.S. Patents 2,708,656 and 2,714,577 to Fermi et al.; Glasstone, Principles of Nuclear Reactor Engineering, D. Van Nostrand Co.; Schultz, The Control of Nuclear Reactors and Power Plants, McGraw-Hill; The Reactor Handbook (3 volumes), and Research Reactors, published by the U.S. Atomic Energy Commission; and to The Proceedings of the International Conference on the Peaceful Uses of Atomic Energy, held in Geneva, Switzerland, August 1955, and available for sale at the United Nations' Book Store, New York, New York.

The flux pattern across the core of a nuclear reactor is generally distorted or perturbed by various facilities running through the core, for example, experimental units, coolant lines, instrumentation, and control rods. Perturbation of flux has a number of undesirable results. The specific power is not the same throughout the reactor, the power level being set by the heat removal rate from the region of highest specific power. Various thermal gradients are created, and distortions may occur, all leading to reduced operating efficiency. These problems are particularly aggravated by the conventional solid control rod, the absorbing strength of which is proportional to the length it extends into the reactor core. Since the rod is generally only partially inserted into the core, the flux is perturbed non-uniformly along the axis of the channel in which the control rod operates, the unoccupied region of the channel ahead of the rod having a different flux pattern than across the rod, the fuel element, and the moderator. While this characteristic can be partly remedied by designing a rod which is either entirely in or entirely out of the core, this is not seen to be a satisfactory solution since incremental control would not be possible. There is consequently considerable need for a control rod which would permit continual variation of its absorbing strength in a manner which will be uniform along the length of the rod. Such a rod would be fully inserted into the core but yet changes in its absorbing strength would not produce axial flux distortion. The rod should also be "fail-safe," that is, one which would contribute its maximum control worth in the event of any mechanical failure.

An object of my present invention, therefore, is an improved nuclear reactor control rod.

Another object is to provide a control rod which perturbs flux equally along its entire length.

Another object is to provide a control rod which does not have to be driven into the core from an exterior position in the event of emergency shutdown, that is, one in which the time response lag will be at a minimum.

Another object is to provide such a control rod which is fixed in the reactor core and requires no axial displacement for adjusting its neutron absorbing power.

Still another object is to provide such a rod wherein adjustments of neutron absorbing power will not produce axial flux distortions.

Yet another object is to provide such a rod with continuous control over the range of the control element with a simple, fail-safe mechanical linkage.

Further objects and advantages of my invention will become apparent from the following detailed description, taken together with the accompanying drawings.

In the drawings, Figure 1 is an elevation view, partly in section, of an embodiment of my control rod, Figure 2 is a section through Figure 1 showing the control means in a position of maximum absorption surface area, Figure 3 is a similar, partial and enlarged section showing the control means in a position of minimum absorption surface area, and Figure 4 is a schematic representation of my control rod in a nuclear reactor.

Referring now to Figure 1, we see the control rod casing or thimble 1, typically of aluminum, zirconium or stainless steel, which houses the control means. Two shafts 2 and 3 run the length of thimble 1 and are supported therein by transverse plates 4 and 4' through which they pass. Each shaft 2 and 3 carries gears 5, 6, 5' and 6' which engage and couple driving shaft 2 to driven shaft 3. An absorbing sheet 7 is fastened in an axial slot 8 and 9 in shafts 2 and 3 and held therein by a pin or other suitable holding means (not shown).

The absorbing sheet is generally of length approximately equal to the dimension of the reactor which the element is to span. The sheet is broken only in the middle for gears 5' and 6' and support plate 4'. As seen in Figures 2 and 3, the absorbing sheet 7, made of a spring material, is mounted as a double spiral coil, whose axis is parallel to the length of the sheet. The gear system controls the area of the absorption surface by rolling, with an external drive through driving shaft 2, the absorbing sheet in coils about shafts 2 and 3. Figure 2 shows absorbing sheet open to a maximum surface area, and, hence, maximum control, while Figure 3 shows the absorbing sheet completely wound in a position of minimum absorbing area. Continuous variation between these extremes may be made in accordance with flux requirements. If absorbing sheet 7 breaks or the gears fail, the spring feature automatically will expand the absorbing element to its maximum effective radius (i.e., maximum neutron absorption area). The driving shaft 2 is rotated by standard reactor control means (not shown), such as described in Schultz, supra, chapter 5. For example, this may be done by a ratchet wheel and pawl combination driven step-wise by a solenoid against the restraining force of a spiral spring. The driving motor is responsive to the same reactor instrumentation which governs the rate of insertion or withdrawal of a conventional rod into a reactor core.

Absorbing sheet 7 is made of a spring sheet material, for example, steel, stainless steel or nickel-chromium alloy (Inconel) coated with a material of high thermal neutron absorption cross section by conventional metallurgical methods such as electroplating, chemical deposition, painting, and mechanical bonding. For example, cadmium may be applied by electroplating from a cadmium sulfate solution or dip-plated from molten cadmium. A cadmium coating 0.010 inch will absorb about 95% of incident neutrons. Other suitable absorbers are hafnium, boron (which may be used in the form of a boron steel alloy spring as well as a coating), or rare earths such as gadolinium. Gadolinium may be applied to a spring sheet base by electrophoretically plating gadolinium oxide (or a mixed rare earth oxide) onto the surface of the sheet, drying and sintering the oxide in place and then binding this in place with a nickel coating of a few mils, applied electrolytically or by electroless methods. In another suitable method, gadolinium and nickel oxide are electrophoretically applied, and the nickel subsequently reduced by heating in a hydrogen atmosphere.

The following example is offered to illustrate the use of my control rod in a "pool-type" research reactor, a light water moderated and cooled heterogeneous reactor, specifically in the Oak Ridge National Laboratory pool reactor, the Bulk Shielding Facility. For information concerning this well known, unclassified reactor, reference is made to Research Reactors, published by the U.S. Atomic Energy Commission, and to the Geneva Conference paper of W. M. Breazeale et al., paper No. 489, entitled "The Swimming Pool Reactor and Its Modifications," and to the references therein. The element casing is aluminum, 3 inch inside diameter, with a wall thickness of about 0.060–0.100 inch. With such dimensions, the control rod will fit into any of the core lattice spacings. The length of the element is 5 feet with an active absorption region of 3 feet, the upper 2 feet being utilized for the drive mechanism of the sort previously described. The spring sheet is of 0.015 inch Inconel with a 0.010 inch cadmium coating applied by dipping, and has a total surface area of about 350 sq. in. The diameter of each shaft is 2½ in., and the gears are approximately 1 in. diameter by 1–1½ in. long with 20–30 teeth per gear. The driving shaft is rotated by ratchet and pawl means, solenoid actuated, and connected to the reactor instrumentation system through a neutron counter. This element will control a reactivity of about 4% $\Delta k$ in the most absorbing state (fully unrolled) and about 1½% $\Delta k$ in the least absorbing state.

Thus, two such elements would control this reactor. The existing shim, safety and regulating rods of this reactor would not be necessary. As reactivity is lost from burn-up of $U^{235}$ in the core, the two elements would be continually adjusted by rolling the absorbing spring sheets to a less effective configuration. When the reactivity loss from $U^{235}$ burn-up exceeds 4–5%, one of the elements would be withdrawn while the other is simultaneously expanded to take over full control.

Figure 4 schematically shows my control element in a pool-type reactor 10, such as referred to above. The control rod is positioned in the core 11, which sits in the bottom of a tank 12 containing water 13.

Various modifications may be made of my invention, while yet using its basic features. For example, for use in a high temperature reactor, particularly power reactors, the control rod should be cooled. To accomplish this, a coolant line may be provided in the thimble. Another modified design would use a perforated casing, say ¼ inch diameter holes spaced on 2 inch centers, to allow moderator water to fill the casing. To allow free movement of the absorbing spring-sheet, it would also be perforated, again with ¼ inch diameter holes on 2 inch centers. In this case the coil-up shafts would pass through seals into a water-tight enclosure for the drive mechanism. In this form the control effectiveness would be enhanced by the presence of the moderator.

Since my invention may be variously modified and the above examples are illustrative rather than restrictive, my invention should be understood to be limited only as indicated by the appended claims.

I claim:
1. An improved control rod for a nuclear reactor comprising a container, two shafts axially disposed in parallel relationship in said container, corresponding, engaging gears mounted on each shaft, a spring sheet containing a neutron absorbing material disposed along the longitudinal axes of said shafts, said sheet engaging each said shafts at the lateral edges of said sheet, the rotation of one of said shafts driving the other said shaft in an opposite direction of rotation, thereby equally altering the total amount of said sheet wound on said shafts and adjusting the effective surface area of said sheet for neutron absorption.

2. In a nuclear reactor, a control device comprising a sheet containing a material having a high thermal-neutron absorption cross-section, shaft means engaging said sheet along the longitudinal axis said shaft means, and means for winding and unwinding said sheet around said shaft means.

3. An improved control rod for a nuclear reactor comprising a container, two parallel shafts disposed in said container along the longitudinal axis said container, a spring sheet containing a material having a high thermal neutron absorption cross-section engaging each said shaft along the longitudinal axis of each said shaft, and means for winding said sheet simultaneously on said shafts and for unwinding said sheet simultaneously on said shafts, thereby changing the effective neutron absorption surface area of said sheet.

4. An improved control rod for a nuclear reactor comprising a container, two parallel shafts longitudinally disposed in said container, engaging gears mounted on said shafts, a spring sheet containing a neutron absorbing material engaging said shafts along the longitudinal axes of said shafts, the simultaneous, opposed rotation of said gears rotating said shafts in opposite directions, thereby adjusting the amount of said sheet wound on said shafts, whereby the effective neutron absorption surface area of said control rod is controlled uniformly along its length.

5. In a nuclear reactor, a control device comprising a sheet containing a material having a high thermal-neutron absorption cross-section positioned along the longitudinal axis of said device, rotation means engaging said sheet, said rotation means being adapted to wind said sheet about said axis and to unwind said sheet about said axis, thereby changing the effective surface area of said sheet.

References Cited in the file of this patent
FOREIGN PATENTS
233,011    Switzerland _____ Oct. 2, 1944